(12) United States Patent
Fujiwara et al.

(10) Patent No.: US 8,357,437 B2
(45) Date of Patent: Jan. 22, 2013

(54) LIGHT-SHIELDING FILM-ATTACHED GLASS SUBSTRATE AND LIQUID CRYSTAL DISPLAY DEVICE

(75) Inventors: Teruo Fujiwara, Tokyo (JP); Yasuhiko Akao, Tokyo (JP); Takehiko Hiruma, Tokyo (JP); Eiji Ichikura, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/069,241

(22) Filed: Mar. 22, 2011

(65) Prior Publication Data

US 2011/0236604 A1  Sep. 29, 2011

(30) Foreign Application Priority Data

Mar. 23, 2010 (JP) ................................ 2010-065964

(51) Int. Cl.
*B32B 15/00* (2006.01)
*C09K 19/00* (2006.01)
*G02F 1/1333* (2006.01)

(52) U.S. Cl. .................. 428/1.62; 428/432; 349/110
(58) Field of Classification Search .............. None
See application file for complete search history.

(56) References Cited

U.S. PATENT DOCUMENTS

| 2002/0115003 | A1* | 8/2002 | Tsukamoto et al. ........... 430/5 |
| 2004/0114090 | A1* | 6/2004 | Washizawa et al. ......... 349/158 |
| 2006/0204730 | A1* | 9/2006 | Nakamura et al. ....... 428/195.1 |
| 2007/0212618 | A1* | 9/2007 | Yoshikawa et al. ............ 430/5 |

FOREIGN PATENT DOCUMENTS

| JP | 08-029768 | | 2/1996 |
| JP | 08-036171 | | 2/1996 |
| JP | 08036171 | A * | 2/1996 |

* cited by examiner

*Primary Examiner* — Angela Ortiz
*Assistant Examiner* — Anthony J Frost
(74) *Attorney, Agent, or Firm* — Foley & Lardner LLP (57) ABSTRACT

The present invention relates to a light-shielding film-attached glass substrate including: a glass substrate; and a light-shielding film having a multilayer structure and being formed on the glass substrate, in which the light-shielding film having a multilayer structure includes: a first chromium oxynitride film ($CrO_{x1}N_{y1}$); and a second chromium oxynitride film ($CrO_{x2}N_{y2}$), each satisfying the following conditions and being laminated in this order from the glass substrate side: $0.15 < x_1 < 0.5$, $0.1 < y_1 < 0.35$, $0.4 < x_{1+y1} < 0.65$, $0.03 < x_2 < 0.15$, and $0.09 < y_2 < 0.25$.

2 Claims, 6 Drawing Sheets

LIGHT-SHIELDING FILM-ATTACHED GLASS SUBSTRATE AND LIQUID CRYSTAL DISPLAY DEVICE

FIELD OF THE INVENTION

The present invention relates to a light-shielding film-attached glass substrate and a liquid crystal display device using the light-shielding film-attached glass substrate.

BACKGROUND OF THE INVENTION

Recently, a flat panel display (FPD) is being more and more reduced in the thickness of the display panel. Reduction of the panel thickness is aggressively proceeding particularly in a display panel for portable terminal equipment such as cellular phone and PDA so as to meet the requirement for a lightweight device.

As a technique for reducing the thickness of the display panel, a method of laminating together a CF substrate and a TFT array substrate in a color liquid crystal display device and then, thinning the outer surface of the glass substrate by a chemical or physical method (e.g., chemical etching etc.) is performed.

For example, a finished panel having a thickness of 0.7 mm which is a standard thickness of generally produced sheet glass for FPD or having a slightly small thickness of 0.5 to 0.6 mm is sometimes subjected to etching so as to reduce the thickness to 0.2 to 0.3 mm.

Conventionally, when a glass substrate has some degrees of thickness, there is no problem with the strength thereof, because the glass substrate itself originally has high strength, but the above-described reduction in the thickness of the glass substrate brings about a new problem that the strength of the finally formed glass substrate decreases.

In a color liquid crystal display device, the color filter substrate or the like used therefor is provided with a black matrix (BM) so as to enhance the display quality including display contrast of the image. This BM shades the periphery of the display portion of each color pixel to prevent colors from decoloration of each color of three primary colors R, G and B adjacent to each other of a color filter and is generally used to improve the contrast of color display and increase the display quality.

Important characteristics as BM include optical characteristics, specifically, high light shielding ratio and low reflectivity. In order to prevent color mixing due to colors from decoloration of respective colors, unnecessary light from a light source needs to be sufficiently shielded. Also, in order to prevent external light from reflecting on the display side (observer side) and disallow reflected light to reduce the contrast of the display image, the reflectivity needs to be low.

A highly light-shielding metal film, particularly a chromium film, has been conventionally used as a light-shielding film for color liquid crystal display devices. The chromium film has high light-shielding property but its visible light reflectivity is about 50% and for more increasing the contrast, the visible light reflectivity needs to be more lowered. Therefore, a method of laminating a chromium oxide film on the chromium film and reducing the visible light reflectivity by using light interference has been proposed.

In order to meet the requirement for a light-shielding film with a lower visible light reflectivity, the applicant of the present invention had proposed the followings in Patent Document 1. (1) A light-shielding film for liquid crystal display devices, which is provided on a transparent substrate, the light-shielding film having a layer structure consisting of a chromium oxide film and a chromium nitride film from the transparent substrate side; (2) the light-shielding film for liquid crystal display devices as described in (1) above, which has a metal chromium film on the chromium nitride film to the transparent substrate; and (3) the light-shielding film for liquid crystal display devices as described in (1) or (2) above, wherein a chromium oxynitride film is used in stead of the chromium oxide film.

Also, the applicant of the present invention had proposed the followings in Patent Document 2.

(1) A light-shielding film for liquid crystal display devices, which is provided on a transparent substrate, the light-shielding film having a layer structure consisting of a chromium oxynitride film and a chromium film from the transparent substrate side, wherein the composition of the chromium oxynitride film, as expressed by $Cr_{1-x-y}O_xN_y$ in terms of the element concentration, is in the following ranges:

$$0.30 \leq x \leq 0.55, \text{ and}$$

$$0.03 \leq y \leq 0.20.$$

(2) A liquid crystal display device which uses, as one substrate for interposing a liquid crystal layer therebetween, a substrate comprising a transparent substrate, a color filter film formed in the portion corresponding to a pixel on the transparent substrate, the light-shielding film for liquid crystal display devices described in (1) above, which is formed in the portion corresponding to an area between pixels, and a transparent electrode film formed thereon.

These light-shielding films for liquid crystal display devices can greatly decrease the reflectivity over the entire visible region as well as in the vicinity of a wavelength of 555 nm where the spectral luminous efficiency becomes maximum, compared with a conventional light-shielding film composed of a chromium oxide film and a chromium film. Accordingly, such a light-shielding film for liquid crystal display devices makes it possible to obtain a light-shielding film having a sufficiently low reflectivity in the visible region, specifically, a light-shielding film having a luminous reflectivity (Y) of about 5%, which cannot be realized in a conventional light-shielding film composed of a chromium oxide film and a chromium film by any thickness adjustment.

In this way, the development of conventional light-shielding film-attached glass substrates mainly puts the focus on enhancement of optical characteristics, and the relationship between the light-shielding film and the strength of the liquid crystal display device has not been discussed.

However, the thickness reduction of a liquid crystal display device for portable terminal equipment such as cellular phone and PDA is accompanied by a requirement to enhance the breaking strength of a liquid crystal display device. In turn, the light-shielding film-attached glass substrate used for the production of a liquid crystal display device is also required to improve in the breaking strength.

For example, the light-shielding films for liquid crystal display devices described in Patent Documents 1 and 2 are excellent from the aspect of low reflectivity in the visible region but are not necessarily sufficient in terms of breaking strength of the light-shielding film-attached glass substrate.

Conventionally, the strength of the light shielding film-attached glass substrate is thought to dominant in the strength of the glass substrate itself accounting for a majority of the volume, and it has not been considered that the light-shielding film very thinly formed on the glass substrate surface has a great effect.

[Patent Document 1] JP-A-8-36171
[Patent Document 2] JP-A-8-29768

SUMMARY OF THE INVENTION

In order to solve the problems in those conventional techniques, an object of the present invention is to provide a light-shielding film-attached glass substrate capable of achieving a sufficiently low reflectivity in the visible region and a light-shielding effect and at the same time, ensuring excellent breaking strength.

Accordingly, an object of the invention is to provide a light-shielding film-attached glass substrate comprising:

a glass substrate; and a light-shielding film having a multilayer structure and being formed on the glass substrate, wherein said light-shielding film having a multilayer structure comprises:

a first chromium oxynitride film ($CrO_{x1}N_{y1}$); and a second chromium oxynitride film ($CrO_{x2}N_{y2}$), each satisfying the following conditions and being laminated in this order from the glass substrate side:

$$0.15 < x_1 < 0.5,$$

$$0.1 < y_1 < 0.35,$$

$$0.4 < x_1 + y_1 < 0.65,$$

$$0.03 < x_2 < 0.15, \text{ and}$$

$$0.09 < y_2 < 0.25.$$

In the light-shielding film-attached glass substrate of the present invention, the light-shielding film having a multilayer structure may further comprise a chromium oxide film ($CrO_{x3}$) satisfying the following condition and being laminated on the second chromium oxynitride film ($CrO_{x2}N_{y2}$):

$$0.07 < x_3 < 0.3.$$

Here, it is preferable that a thickness of the first chromium oxynitride film is from 25 to 75 nm, a total thickness of the second chromium oxynitride film and the chromium oxide film is from 75 to 125 nm and a ratio (t/T) of the thickness (t) of the chromium oxide film to the total thickness (T) of the second chromium oxynitride film and the chromium oxide film is from 0.05 to 0.75.

In the light-shielding film-attached glass substrate of the present invention, a ratio $I_C/I_G$ between a maximum intensity $I_G$ of X-ray diffraction at θ–2θ=42.0° to 45.0° of the glass substrate and a maximum intensity $I_C$ of X-ray diffraction at θ–2θ=42.0° to 45.0° of the light-shielding film-attached glass substrate preferably satisfies $I_C/I_G \leq 1.5$, more preferably $I_C/I_G \leq 1.4$.

Also, the present invention provides a liquid crystal display device comprising:

a liquid crystal layer; and a pair of substrates for interposing the liquid crystal layer therebetween, wherein one of said pair of substrates is the light-shielding film-attached glass substrate.

According to the present invention, a light-shielding film-attached glass substrate for liquid crystal display devices, enabling a sufficiently low reflectivity in the visible region and at the same time, ensuring excellent breaking strength of the light-shielding film including the glass substrate, can be provided.

DETAILED DESCRIPTION OF THE INVENTION

The light-shielding film-attached glass substrate of the present invention is described below by referring to the drawings.

Figure 1:
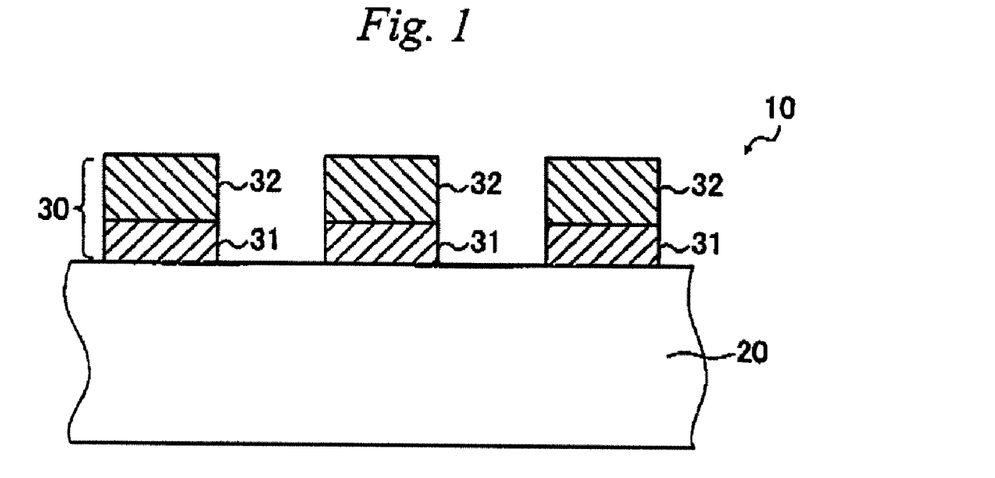
FIG. 1 is a cross-sectional view showing one embodiment of the light-shielding film-attached glass substrate of the present invention.

FIG. 1 is a cross-sectional view showing one embodiment of the light-shielding film-attached glass substrate of the present invention. In the light-shielding film-attached glass substrate 10 shown in FIG. 1, a light-shielding film 30 having a multilayer structure obtained by laminating a first chromium oxynitride film 31 and a second chromium oxynitride film 32 in this order is formed on a glass substrate 20.

Incidentally, the light-shielding film 30 shown in FIG. 1 is in a state of being patterned to form a color filter film on the glass substrate 20.

In the light-shielding film-attached glass substrate 10 shown in FIG. 1, the glass substrate 20 surface on the side where the light-shielding film 30 having a multilayer structure is not formed work out to the display surface in a liquid crystal display device.

In the light-shielding film 30 shown in FIG. 1, the first chromium oxynitride film 31 is transparent in the visible region and mainly fulfills a function as a low reflection film. If the reflectivity on the display side (observer side) of a liquid crystal display device is high, external light is reflected and the reflected light decreases the contrast of the display image. Therefore, the reflectivity needs to be lowered.

The term "low reflection" as used herein indicates that the luminous reflectivity (Y value) from the display surface side in the light-shielding film-attached glass substrate is 6.5% or less. The luminous reflectivity is preferably 6.0% or less, more preferably 5.5% or less.

Also, the first chromium oxynitride film 31 is required to have a good pattern edge profile and sufficiently high heat resistance, acid resistance and alkali resistance.

In order to fulfill these physical properties, the film composition ($CrO_{x1}N_{y1}$) of the first chromium oxynitride film 31 satisfies the following (1) to (3).

Here, $x_1$ indicates the ratio (at %) of oxygen atom in the first chromium oxynitride film, and $y_1$ indicates the ratio (at %) of nitrogen atom in the first chromium oxynitride film.

Incidentally, the ratio (at %) of chromium atom in the first chromium oxynitride film becomes $1-x_1-y_1$.

$$0.15<x_1<0.5 \quad (1)$$

$$0.1<y_1<0.35 \quad (2)$$

$$0.4<x_1+y_1<0.65 \quad (3)$$

If the ratio $x_1$ of oxygen atom in the first chromium oxynitride film 31 is 0.15 at % or less, there is a problem that the luminous reflectivity (Y value) from the display surface side in the light-shielding film-attached glass substrate is increased, whereas if $x_1$ is 0.5 at % or more, the etching rate is lowered, making it difficult to form BM by patterning.

$x_1$ preferably satisfies the following (4), more preferably the following (5).

$$0.2<x_1<0.4 \quad (4)$$

$$0.25<x_1<0.35 \quad (5)$$

If the ratio $y_1$ of nitrogen atom in the first chromium oxynitride film 31 is 0.1 at % or less, there is a problem that the luminous reflectivity (Y value) from the display surface side in the light-shielding film-attached glass substrate is increased, whereas if $y_1$ is 0.35 at % or more, the etching rate is lowered, making it difficult to form BM by patterning.

$y_1$ preferably satisfies the following (6), more preferably the following (7).

$$0.15<y_1<0.3 \quad (6)$$

$$0.2<y_1<0.3 \quad (7)$$

If the total $x_1+y_1$ of the ratios of oxygen atom and nitrogen atom in the first chromium oxynitride film 31 is 0.4 at % or less, there is a problem that the luminous reflectivity (Y value) from the display surface side in the light-shielding film-attached glass substrate is increased, whereas if $x_1+y_1$ is 0.65 at % or more, the etching rate is lowered, making it difficult to form BM by patterning.

$x_1+y_1$ preferably satisfies the following (8), more preferably the following (9).

$$0.45<x_1+y_1<0.6 \quad (8)$$

$$0.45<x_1+y_1<0.55 \quad (9)$$

The first chromium oxynitride film 31 preferably has a film thickness of 25 to 75 nm in view of low reflection performance, more preferably from 35 to 65 nm, still more preferably from 40 to 60 nm.

In the light-shielding film 30 shown in FIG. 1, the second chromium oxynitride film 32 is opaque in the visible region and mainly fulfills a function as a light-shielding film. The term "light-shielding property" as used herein means that the OD value (Optical Density value; the optical density indicating the attenuation amount of transmitted light) in the light-shielding film-attached glass substrate is 3.8 or more. The value is preferably 4.0 or more, more preferably 4.2 or more.

Also, the second chromium oxynitride film 32 is required to have a good pattern edge profile and sufficiently high heat resistance, acid resistance and alkali resistance.

In order to fulfill these physical properties, the film composition ($CrO_{x2}N_{y2}$) of the second chromium oxynitride film 32 satisfies the following (10) and (11).

Here, $x_2$ indicates the ratio (at %) of oxygen atom in the second chromium oxynitride film, and $y_2$ indicates the ratio (at %) of nitrogen atom in the second chromium oxynitride film. Incidentally, the ratio (at %) of chromium atom in the second chromium oxynitride film becomes $1-x_2-y_2$.

$$0.03<x_2<0.15 \quad (10)$$

$$0.09<y_2<0.25 \quad (11)$$

When the film composition satisfies the conditions (10) and (11), the second chromium oxynitride film ($CrO_{x2}N_{y2}$) 32 is in an amorphous crystal state. The term "amorphous crystal state" as used in the present invention includes a microcrystal structure, in addition to an amorphous structure with absolutely no crystal structure.

In the light-shielding film-attached glass substrate of the present invention, the second chromium oxynitride film 32 is a film having an amorphous structure or a film having a microcrystal structure, whereby the cracking strength of the light-shielding film-attached substrate is enhanced.

At the time of performing a breaking strength test of the light-shielding film-attached glass substrate by the later-described procedure, an origin for cracking is sometimes generated in the light-shielding film surface formed on a glass substrate, and cracks may develop and propagate through the glass substrate, leading to breaking of the light-shielding film-attached glass substrate. When the second chromium oxynitride film 32 is a film having an amorphous structure or a microcrystal structure, an origin for cracking is hardly produced in the light-shielding film surface compared with a film having a crystal structure. Moreover, even when an origin for cracking is generated, cracks are hardly developed in the light-shielding film compared with a film having a crystal structure. For these reasons, the cracking strength of the light-shielding film-attached glass substrate is enhanced.

Whether the second chromium oxynitride film 32 is in an amorphous crystal state can be confirmed by the X-ray diffraction (XRD) method. That is, when the second chromium oxynitride film 32 is a film having an amorphous structure or a microcrystal structure, no sharp peak is observed on the diffraction peak obtainable by XRD measurement.

Also, whether the second chromium oxynitride film 32 is in an amorphous crystal state can be confirmed by the ratio $I_C/I_G$ between the maximum intensity $I_G$ of XRD at $\theta-2\theta=42.0°$ to $45.0°$ of the glass substrate 20 and the maximum intensity $I_C$ of XRD at $\theta-2\theta=42.0°$ to $45.0°$ of the light-shielding film-attached glass substrate 10. More specifically, when the second chromium oxynitride film 32 is in an amorphous crystal state, the ratio satisfies $I_C/I_G \leq 1.5$. In the light-shielding film-attached glass substrate of the present invention, the ratio is more preferably $I_C/I_G \leq 1.4$.

If the ratio $x_2$ of oxygen atom in the second chromium oxynitride film 32 is 0.03 at % or less, there is a problem that the strength of the light-shielding film-attached glass substrate is not sufficiently enhanced, whereas if $x_2$ is 0.15 at % or more, the etching rate of the light-shielding film is lowered, making it difficult to form BM by patterning.

$x_2$ preferably satisfies the following (12).

$$0.03<x_2<0.12 \quad (12)$$

If the ratio $y_2$ of nitrogen atom in the second chromium oxynitride film 32 is 0.09 at % or less, there is a problem that the strength of the light-shielding film-attached glass substrate is not sufficiently enhanced, whereas if $y_2$ is 0.25 at % or more, the etching rate of the light-shielding film is lowered, making it difficult to form BM by patterning.

$y_2$ preferably satisfies the following (13).

$$0.1<y_2<0.2 \quad (13)$$

The total $x_2+y_2$ of the ratios of oxygen atom and nitrogen atom in the second chromium oxynitride film 32 preferably satisfies the following (14), because both strength enhancement of the light-shielding film-attached glass substrate and pattern edge profile are satisfied, and it is more preferred to satisfy the following (15).

$$0.15<x_2+y_2<0.30 \quad (14)$$

$$0.17<x_2+y_2<0.25 \quad (15)$$

The second chromium oxynitride film 32 preferably has a film thickness of 75 to 125 nm. If the film thickness is less than 75 nm, a sufficient light-shielding effect as BM cannot be exerted and an OD value may be small, whereas if the film thickness exceeds 125 nm, this may give rise to reduction in the productivity and an increase in the cost. The thickness of the second chromium oxynitride film 32 is more preferably from 85 to 115 nm, still more preferably from 90 to 110 nm.

Figure 2:
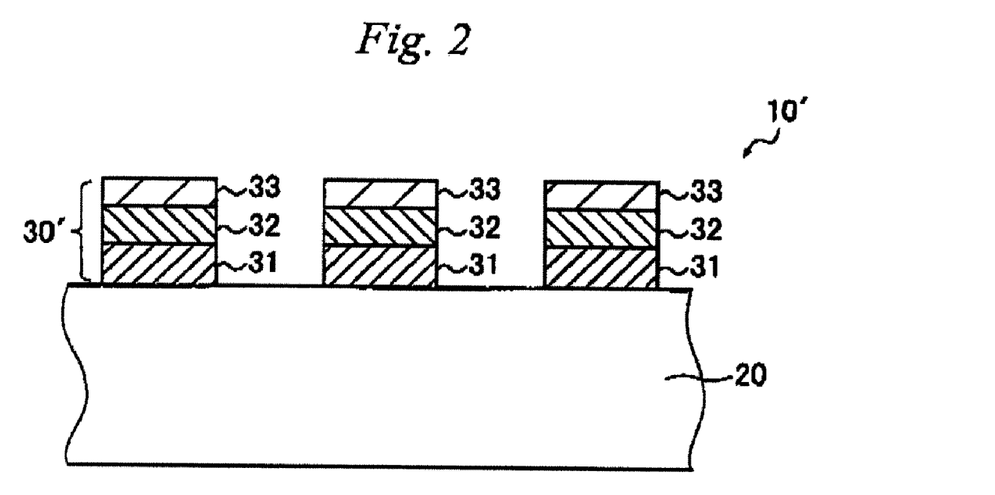
FIG. 2 is a cross-sectional view showing another embodiment of the light-shielding film-attached glass substrate of the present invention.

FIG. 2 is a cross-sectional view showing another embodiment of the light-shielding film-attached glass substrate of the present invention. In the light-shielding film-attached glass substrate 10' shown in FIG. 2, a light-shielding film 30' having a multilayer structure obtained by laminating a first chromium oxynitride film 31, a second chromium oxynitride film 32 and a chromium oxide film 33 in this order is formed on a glass substrate 20.

The chromium oxide film 33 when having the later-described specific composition is opaque in the visible region and at the same time, in an amorphous crystal state and therefore, can exert the same function as that of the second chromium oxynitride film 32.

In the case of a layer constitution where a chromium oxynitride chromium film and a chromium oxide film are laminated in this order on a glass substrate as in Patent Document 1, when a chromium oxide film satisfying optical characteristics is deposited, sufficiently high strength as a light-shielding film-attached glass substrate cannot be obtained. In the present invention, as shown in FIG. 2, a structure where a chromium oxide film 33 is laminated on the second chromium oxynitride film 32 is employed, and it is required that the total thickness of the second chromium oxynitride film 32 and the chromium oxide film 33 satisfies the above-described suitable thickness range of the second chromium oxynitride film 32 and the ratio of the thickness of the chromium oxide film 33 to the total thickness of the second chromium oxynitride film 32 and the chromium oxide film 33 satisfies the Later-described range.

In order to fulfill these physical properties, the film composition ($CrO_{x3}$) of the chromium oxide film 33 preferably satisfies the following (16).

Here, $x_3$ indicates the ratio (at %) of oxygen atom in the chromium oxide film. Incidentally, the ratio (at %) of chromium atom in the chromium oxide film becomes $1-x_3$.

$$0.07 < x_3 < 0.3 \quad (16)$$

If the ratio $x_3$ of oxygen atom in the chromium oxide film 33 is 0.07 at % or less, there is a problem that the strength of the light-shielding film-attached glass substrate is not sufficiently enhanced, whereas if $x_3$ is 0.3 at % or more, the etching rate of the light-shielding film is lowered, making it difficult to form BM by patterning.

$x_3$ preferably satisfies the following (17).

$$0.09 < x_3 < 0.25 \quad (17)$$

The total thickness of the second chromium oxynitride film 32 and the chromium oxide film 33 is preferably from 75 to 125 nm. If the total film thickness is less than 75 nm, a sufficient light-shielding effect as BM cannot be exerted and an OD value may be small, whereas if the total film thickness exceeds 125 nm, this may give rise to reduction in the productivity and an increase in the cost. The total thickness of the second chromium oxynitride film 32 and the chromium oxide film 33 is more preferably from 85 to 115 nm, still more preferably from 90 to 110 nm.

The ratio (t/T) of the thickness (t) of the chromium oxide film 33 to the total thickness (T) of the second chromium oxynitride film 32 and the chromium oxide film 33 is preferably from 0.05 to 0.75 for the purpose of enhancing the strength and obtaining a good pattern profile, and the ratio is more preferably from 0.05 to 0.50.

In the light-shielding film-attached glass substrate of the present invention, the light-shielding film formed on a glass substrate is a light-shielding film having a multilayer structure where the above-described first chromium oxynitride film and second chromium oxynitride film are laminated in this order, or a light-shielding film having a multilayer structure where the above-described chromium oxide film is further formed on the second chromium oxynitride film, and therefore, the luminous reflectivity (Y value) from the display surface side is low and is 6.5% or less, preferably 6.0% or less, more preferably 5.5% or less. Also, the OD value is 3.8 or more, preferably 4.0 or more, more preferably 4.2 or more.

These first chromium oxynitride film 31, second chromium oxynitride film 32 and chromium oxide film 33 can be formed by a known film deposition method such as sputtering. The sputtering method used here is not particularly limited, and various sputtering methods such as DC sputtering, RF sputtering, magnetron sputtering and ion beam sputtering can be used.

In the case of forming the first chromium oxynitride film 31 or second chromium oxynitride film 32 by using a DC sputtering method, a metal chromium target is used as the target, and a mixed gas of oxygen or carbon dioxide and an inert gas such as nitrogen and argon gas is used as the sputtering gas. Here, the compositions of the chromium oxynitride films 31 and 32 can be controlled by the mixing ratio of a mixed gas used as the sputtering gas, the gas pressure of the sputtering gas, or the electric power charged.

In the case of forming the chromium oxide film 33 by using a DC sputtering method, a metal chromium target is used as the target, and a mixed gas of oxygen and an inert gas such as argon gas is used as the sputtering gas.

The compositions of the chromium oxynitride films 31 and 32 and chromium oxide film 33 formed can be controlled by the mixing ratio of a mixed gas used as the sputtering gas, the gas pressure of the sputtering gas, or the electric power charged.

The sputtering conditions vary depending on the sputtering method used, but in the case of a DC sputtering method, sputtering is preferably performed under the following conditions: power density during sputtering: from 0.4 to 5 W/cm$^2$, more preferably from 0.5 to 2.5 W/cm$^2$; sputtering pressure: from 0.15 to 0.5 Pa, more preferably from 0.2 to 035 Pa; film deposition temperature (substrate temperature): from room temperature to 300° C., more preferably from room temperature to 200° C.

The liquid crystal display device of the present invention includes a liquid crystal layer; and a pair of substrates for interposing the liquid crystal layer therebetween, wherein one of the pair of substrates is the light-shielding film-attached glass substrate of the invention.

The light-shielding film-attached glass substrate of the present invention may be used, for example, as a light-shielding film provided in the background portion when displaying a bright display on a black background, or as a light-shielding film provided in the portion (BM) corresponding to the area between pixels when displaying a color display by using a color filter in combination. The light-shielding film may be provided on the inner surface (liquid crystal layer side) of a cell or may be provided on the outer surface of the cell. The light-shielding film of the present invention exhibits very good characteristics in patterning by a photoprocess and therefore, is preferably usable particularly as a light-shielding film used for BM of a color filter provided on the inner surface of the cell.

In use for BM of a color filter, the light-shielding film is provided in the portion corresponding to the boundary area of display pixels when the liquid crystal cell display surface is viewed from the front side. The display pixel is a portion where the light transmittance is controlled by voltage application and, for example, in a simple matrix type liquid crystal display device, the display pixel corresponds to a portion where a scanning electrode and a data electrode intersect.

Figure 3:
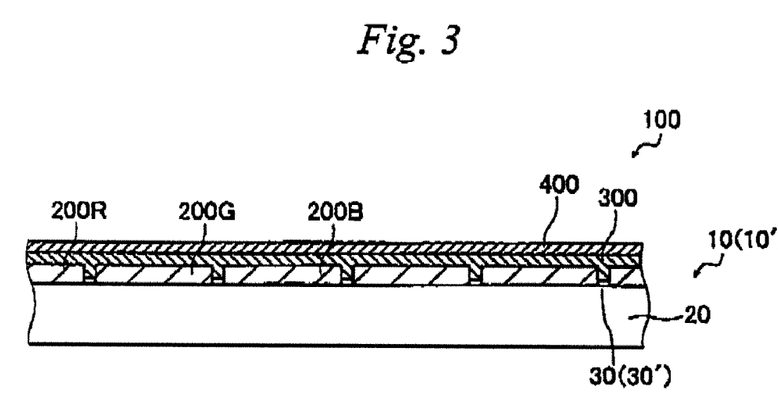
FIG. 3 is a cross-sectional view showing one example of the liquid crystal display device element using the light-shielding film-attached glass substrate of the present invention.

FIG. 3 is a cross-sectional view showing one example of the liquid crystal display device element using the light-shielding film-attached glass substrate of the present invention.

In the liquid crystal display device element 100 shown in FIG. 3, on the glass substrate 20 of the light-shielding film-attached glass substrate 10 (or 10') of the present invention, color filter films 200R, 200G and 200B are formed in the portions corresponding to pixels of the liquid crystal display device, and a light-shielding film 30 (or 30') of the light-shielding film-attached glass substrate 10 (or 10') of the present invention is formed in the portion corresponding to the area between pixels of the liquid crystal display device.

The color filter films 200R, 200G and 200B are formed on the transparent substrate 20 by a known technique. The known technique used here may be any of an electrodeposition method, a photolithography method, a printing method, a dyeing method and the like. A combination thereof may also be used.

On the color filter films 200R, 200G and 200B and the light-shielding film 30 (or 30'), a transparent electrically conductive film 400 for a liquid crystal driving electrode is formed through a transparent protective film 300 which is optionally formed, if desired. The transparent electrically conductive film 400 is usually composed of tin oxide, indium tin oxide (ITO) or the like. The transparent electrically conductive film 400 may be patterned in correspondence to display or when used as a common electrode, may be formed as a solid electrode. The formation method thereof is not particularly limited but from the standpoint of making the layer thickness uniform, a vapor deposition method, a sputtering method and the like are preferably used.

In the liquid crystal display device element 100 shown in FIG. 3, an insulating film such as $SiO_2$ and $TiO_2$, an active element such as TFT, MIM and thin-film diode, a retardation film, a polarizing film, a reflection film, a photoconductive film and the like may be formed, if desired, on or below the transparent electrically conductive film 400 for a liquid crystal driving electrode.

Furthermore, a liquid crystal orientation film may be formed, if desired, on the liquid crystal display device element 100 shown in FIG. 3. The liquid crystal orientation film may be formed by rubbing an organic resin film such as polyimide, polyamide and polyvinyl alcohol, or obliquely depositing SiO or the like, or a vertical aligning agent is sometimes used by coating it.

As for the method to produce a liquid crystal display device by using the liquid crystal display device element 100 shown in FIG. 3, a conventional method can be employed. That is, the liquid crystal display device element 100 shown in FIG. 3 is used as one of a pair of substrates for interposing a liquid crystal layer therebetween, an electrode-attached substrate obtained by applying an appropriate patterning is used as another substrate, a liquid crystal orientation film is formed, if desired, on the liquid crystal display device element 100, the pair of substrates are caused to face each other through the electrode surface side, the peripheral part thereof is sealed, and a liquid crystal is encapsulated between the substrates, whereby a high-definition color liquid crystal display device can be obtained.

EXAMPLE

The present invention is described in greater detail below by referring to Examples, but the present invention is not limited to these Examples. Here, Examples 1 to 3 are working examples of the present invention and Examples 4 and 5 are comparative examples.

Using a 0.7 mm-thick glass substrate (non-alkali glass "AN100" manufactured by Asahi Glass Co., Ltd.) as the glass substrate, the surface of the glass substrate was cleaned with a detergent to obtain a clean glass substrate surface and without heating the glass substrate, a light-shielding film having a multilayer structure was formed on the glass substrate by using an in-line IDC sputtering apparatus. In Example 1, a light-shielding film having a structure where a first chromium oxynitride film (thickness: 51 nm) and a second chromium oxynitride film (thickness: 115 nm) are laminated, was formed. In Example 2, a light-shielding film having a structure where a first chromium oxynitride film (thickness: 51 nm), a second chromium oxynitride film (thickness: 59 nm) and a chromium oxide film (thickness: 59 nm) are laminated, was formed. In Example 3, a light-shielding film having a structure where a first chromium oxynitride film (thickness: 51 inn) and a second chromium oxynitride film (thickness: 118 nm) are laminated, was formed. In Example 4, a light-shielding film having a structure where a first chromium oxynitride film (thickness: 51 nm) and a second chromium oxynitride film (thickness: 112 nm) are laminated, was formed. In Example 5, a light-shielding film having a structure where a first chromium oxynitride film (thickness: 51 nm) and a second chromium oxynitride film (thickness: 114 nm) are laminated, was formed.

In the formation of the first chromium oxynitride film and the second chromium oxynitride film, a metal chromium target was used as the target, and a mixed gas of oxygen, nitrogen and argon gases was used as the sputtering gas. The composition of the chromium oxynitride film was adjusted by controlling the mixing ratio of the mixed gas used as the sputtering gas. The sputtering pressure was 0.3 Pa.

The power density during sputtering of the first chromium oxynitride film was 2.7 $W/cm^2$ in all of Examples 1 to 5.

The power density during sputtering of the second chromium oxynitride film was 2.2 $W/cm^2$ in Examples 1 to 3, 1.8 $W/cm^2$ in Example 4, and 1.9 $W/cm^2$ in Example 5.

In the formation of the chromium oxide film, a metal chromium target was used as the target, and a mixed gas of oxygen and argon gases was used as the sputtering gas. The composition of the chromium oxide film was adjusted by controlling the mixing ratio of the mixed gas used as the sputtering gas. The sputtering pressure at the formation of the chromium oxide film was 0.3 Pa, and the power density during sputtering was 2.2 $W/cm^2$.

The compositional configuration of O and N in each of the formed first chromium oxynitride film, second chromium oxynitride film and chromium oxide film was measured by ESCA analysis. The results are shown in the Table below. In the Table, the unit is at %. The remainder is mainly composed of Cr but contains also a very slight amount of impurities such as C.

The apparatus and measurement conditions used for the elemental analysis by ESCA are shown below.

NPS Apparatus: JEOL JPS-9000MC (manufactured by JEOL)

X-Ray source: Mg-std beam, beam diameter: 6 mm
X-Ray output: 10 kV, 10 mA
Charge compensation: flat gun
Cathode: −100 V
Bias: −10 V
Filament: 1.15 A As for the measuring method, the surface of 10 mm in diameter was etched with $Ar^+$ ion beams at a rate of 1 nm/sec, and the thickness of each layer was measured near the center. The peaks of N (1s), O (1s) and Cr (2s) were measured and after determining each peak area, the atomic number ratio (that is, at %) of the surface was calculated using the following relative sensitivity coefficient:

| O: | 1 s | 11.914 |
|---|---|---|
| N: | 1 s | 7.5128 |
| Cr: | 2 s | 6.4405 |

Also, the crystal state of the second chromium oxynitride film (in Example 2, the crystal states of the second chromium oxynitride film and the chromium oxide film) was confirmed by an X-ray diffraction (XRD) apparatus (manufactured by RIGAKU).

As for the XRD diffraction measurement conditions, Cu was used as the X-ray source, and the span of θ-2θ scanning angle=20 to 90° was measured at a pitch of 0.0200°.

Figure 4:
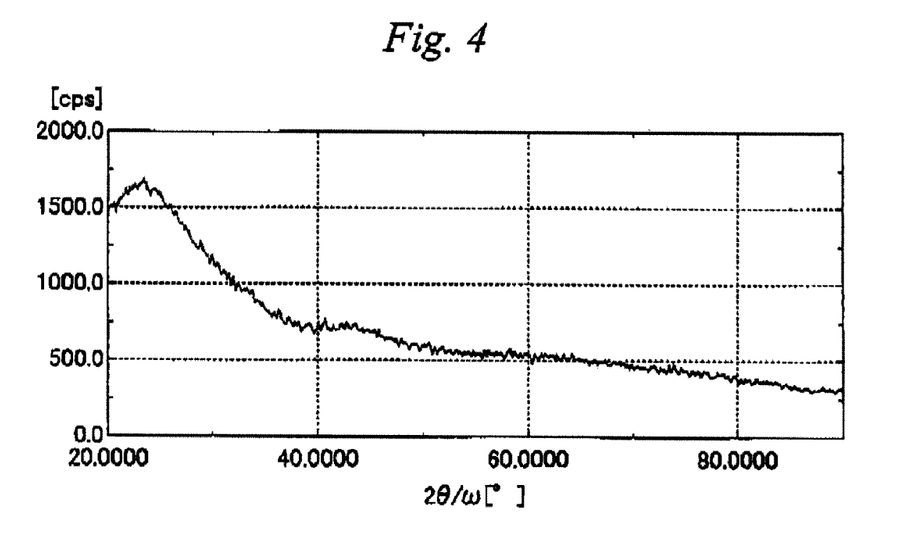
FIG. 4 is a graph showing the results of X-ray diffraction measurement in Examples.
Figure 5:
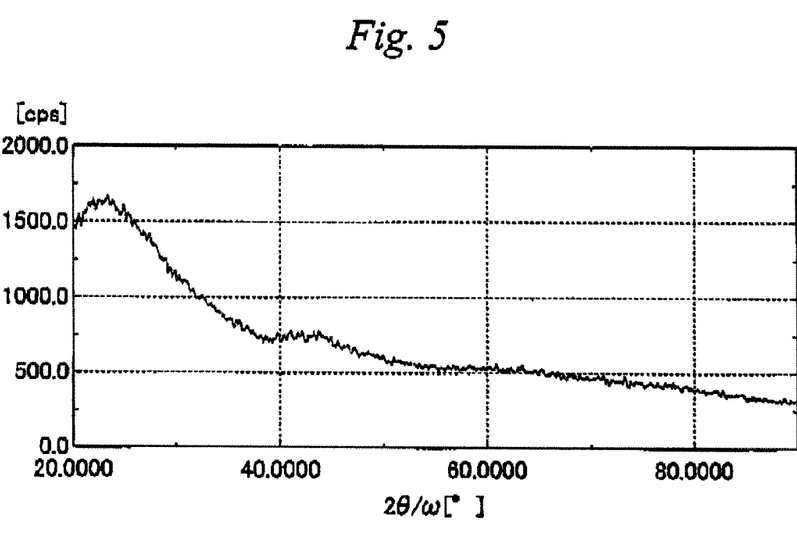
FIG. 5 is a graph showing the results of X-ray diffraction measurement in Examples.
Figure 6:
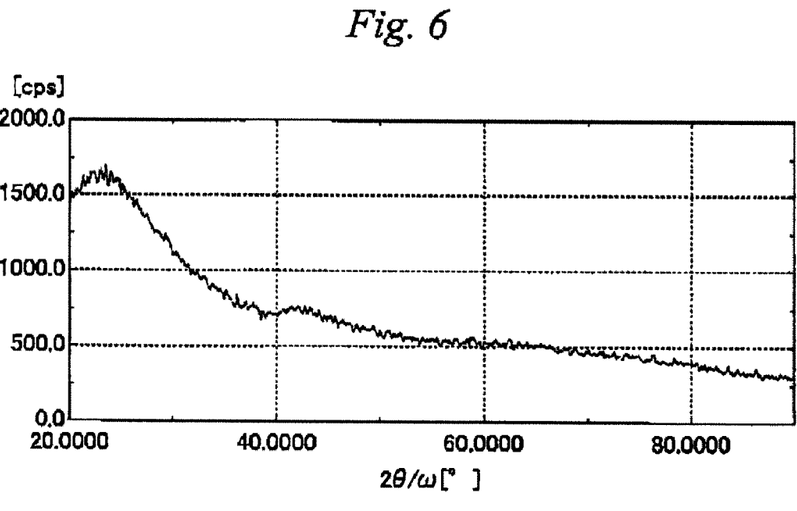
FIG. 6 is a graph showing the results of X-ray diffraction measurement in Examples.
Figure 7:
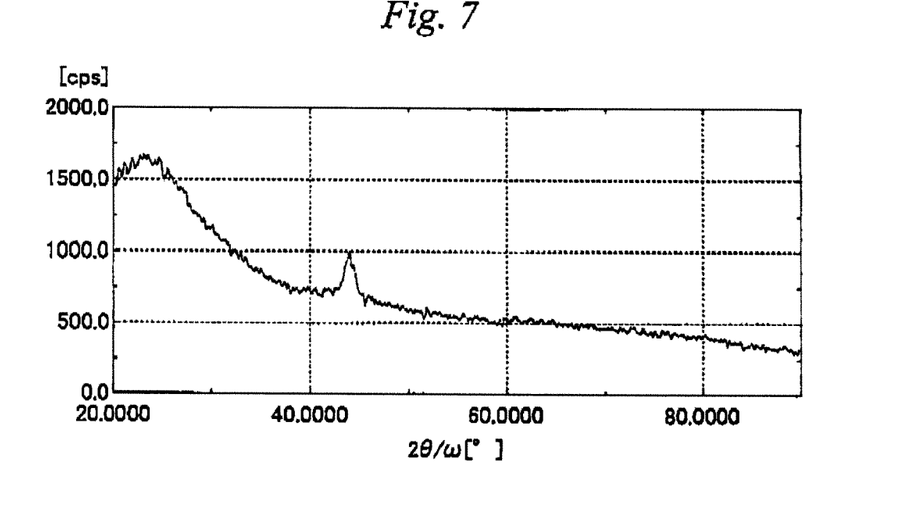
FIG. 7 is a graph showing the results of X-ray diffraction measurement in Examples.
Figure 8:
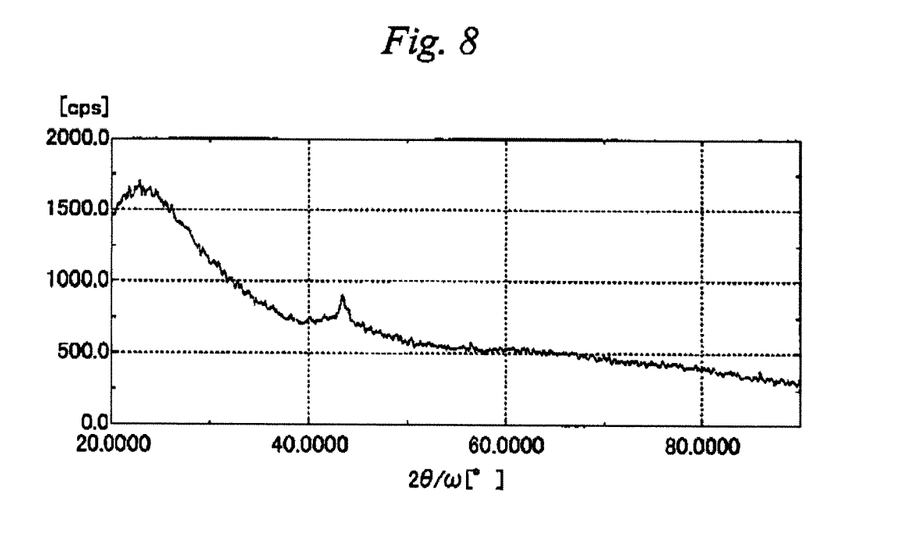
FIG. 8 is a graph showing the results of X-ray diffraction measurement in Examples.
Figure 9:
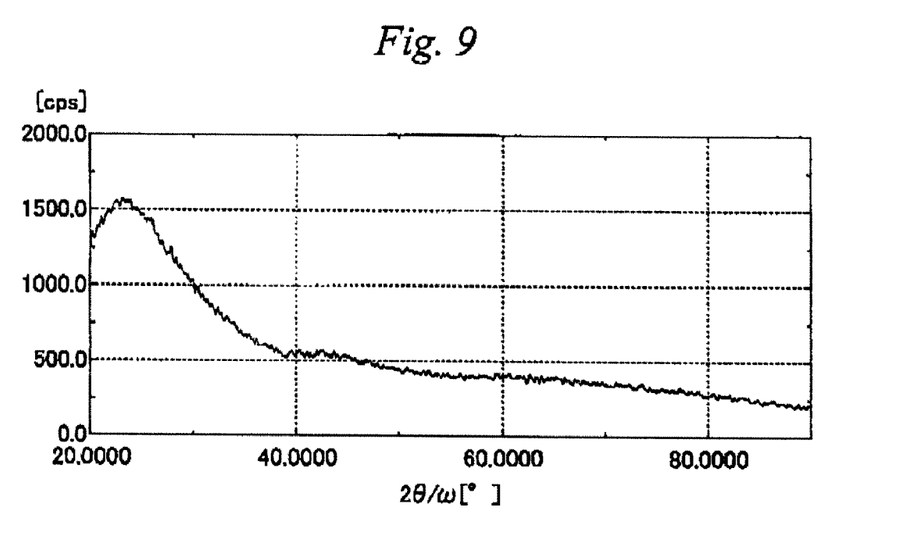
FIG. 9 is a graph showing the results of X-ray diffraction measurement in Examples.

FIGS. 4 to 9 show the diffraction peaks obtained. Incidentally, FIG. 4 is the diffraction peak of Example 1, FIG. 5 is the diffraction peak of Example 2, FIG. 6 is the diffraction peak of Example 3, FIG. 7 is the diffraction peak of Example 4, FIG. 8 is the diffraction peak of Example 5, and FIG. 9 is the diffraction peak of a glass substrate measured without forming a light-shielding film.

As apparent from the Figures, a sharp peak is not observed in Examples 1 to 3 and this verifies that the second chromium oxynitride film (in Example 2, the second chromium oxynitride film and the chromium oxide film) has an amorphous crystal structure or a microcrystal structure. On the other hand, in Examples 4 and 5, a sharp peak is observed and it is confirmed that the second chromium oxynitride film has a crystal structure.

Also, $I_C/I_G$ wherein $I_G$ is the maximum intensity of X-ray diffraction at θ-2θ=42.0° to 45.0° of the glass substrate and $I_C$ is the maximum intensity of X-ray diffraction at θ-2θ=42.0° to 45.0° of the light-shielding film-attached glass substrate is calculated from the measured XRD profile. $I_C$ and $I_C/I_G$ are shown in the Table below. Here, $I_G$ was 572 (cps)

(Breaking Strength)

The light-shielding film-attached glass substrates of Examples 1 to 5 were subjected to a breaking strength test according to the following procedure.

Figure 10:
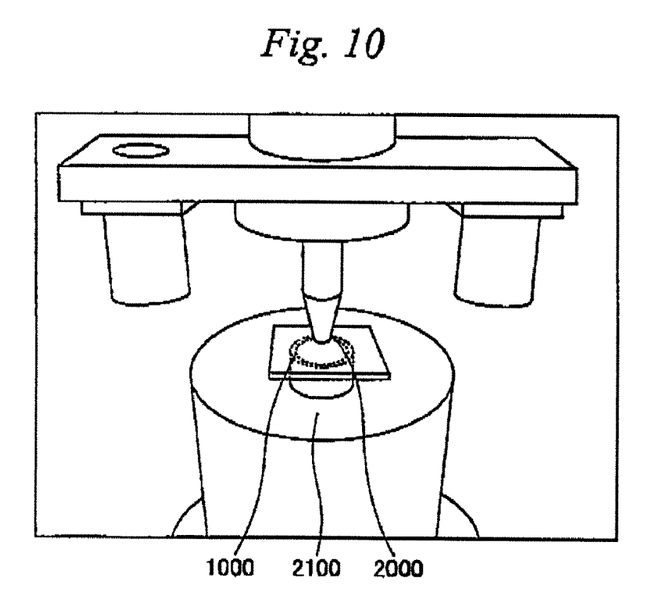
FIG. 10 is a view showing the apparatus used for the breaking strength test in Examples.
Figure 11:
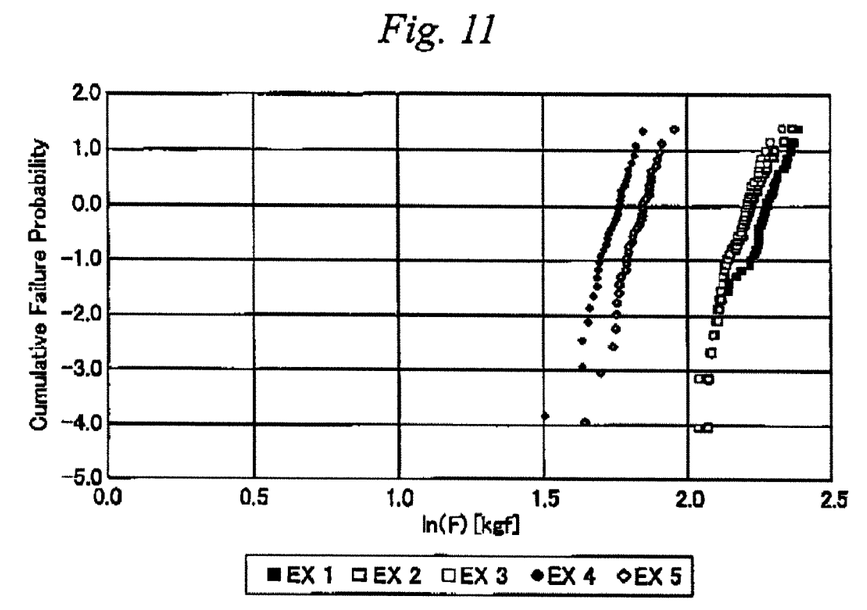
FIG. 11 is a graph showing the results of the breaking strength test.
Figure 12:
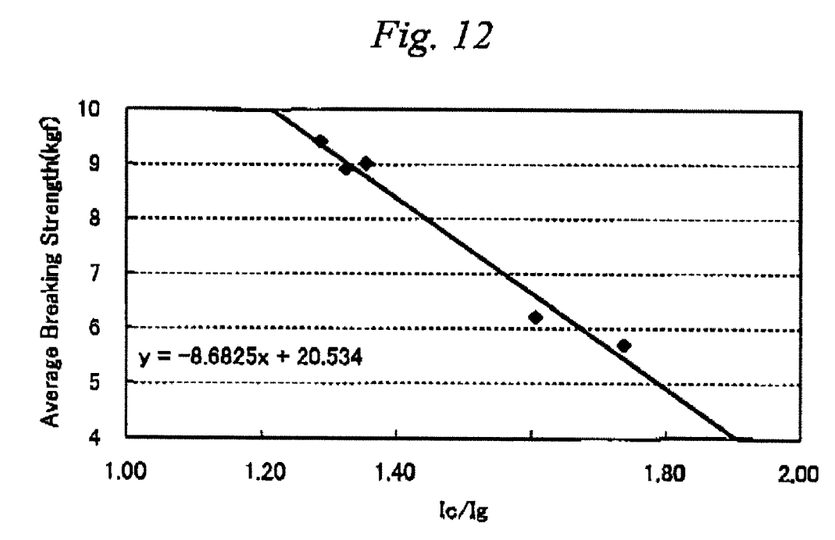
FIG. 12 is a graph showing the relationship between $I_C/I_G$ and the average breaking strength.

FIG. 10 is a view showing the apparatus used for the breaking strength test. On the receiving jig 2100 of the apparatus shown in FIG. 10, a 5 cm-square sample 1000 cut out from the light-shielding film-attached glass substrate was placed with the light-shielding film up, Thereafter, the central region of the sample 1000 was pressed from above the sample 1000 by using a pressing jig 2000, and the pressing force when the sample 1000 was broken was measured. FIG. 11 is a graph showing the results of the breaking strength test, where the abscissa represents the pressing force [kgf] of the pressing jig 60 and the ordinate represents the cumulative failure probability [%]. The average breaking strength determined from the results in FIG. 11 is shown in the Table below. FIG. 12 shows the relationship between $I_C/I_G$ and the average breaking strength.

It is seen from these results that as the second chromium oxynitride film has a more amorphous or microcrystal structure and the $I_C/I_G$ becomes smaller, the average breaking strength is increased. In order to increase the average breaking strength, $I_C/I_G$ is preferably 1.5 or less, more preferably 1.4 or less.

(Low Reflection Performance)

The Y value in the visible region was measured using a spectrophotometer (CM2002, manufactured by Minolta Co., Ltd.). The results are shown in the Table below. Incidentally, as a light-shielding film for liquid crystal display devices, the Y value is preferably 6.5% or less, more preferably 6.0% or less, still more preferably 5.5% or less.

(Light-Shielding Performance)

This performance can be indicated by the OD value=−log $(I/I_0)$, wherein I is the intensity of transmitted light and $I_0$ is the intensity of incident light. A higher optical density value indicates that the light is more shielded. As a light-shielding film for liquid crystal display devices, the OD value must be 3.8 or more, preferably 4.2 or more.

The OD value was measured by means of an optical densitometer, "TD-904", manufactured by Macbeth. The results are shown in the Table below.

(Pattern Edge Profile)

The light-shielding film of the light-shielding film-attached glass substrate obtained by the procedure above was patterned according to the following procedure.

Washing:

Washing with pure water was performed for 5 minutes by using a spin cleaning apparatus.

Resist Film Formation:

A commercially available positive photoresist was spin-coated (500 rpm, 20 sec) to a film thickness of about 1 μm.

Prebaking:

Prebaking was performed at 100° C. for 30 minutes, Exposure:

Exposure was performed under the following conditions: 76 mJ/cm² (365 nm, 25.4 mW/cm², 3 seconds).

Development:

As the developer, NaOH (0.33 wt %) was used (room temperature, 60 seconds).

Post Baking:

Post baking was performed at 120° C. for 10 minutes.

Etching:

Wet etching was performed using ammonium cerium nitrate-perchloric acid mixed solution ($Ce^{4+}$: 13.4 wt %, $HCO_4$: 3.4 wt %, 30° C.) which is a Cr etchant.

Resist Peeling:

The resist peeling was performed using a NaOH aqueous solution (5 wt %) at room temperature for 5 minutes).

After cutting the patterned region, the cross-section of the pattern edge was observed and photographed by a scanning electron microscope (SEM) at a magnification of 40,000, and the pattern edge profile after patterning was evaluated. The results are shown in the Table below. In the Table, the symbols mean the followings. A: The pattern edge has a forward tapered profile; B: the pattern edge has a perpendicular profile; and C: the pattern edge has a reverse tapered profile.

In general, the pattern edge profile is believed to be preferably a perpendicular profile or a forward tapered profile, and it can be confirmed from these results that the light-shielding film-attached glass substrate of the present invention has good patterning characteristics.

TABLE 1

| | First Chromium Oxynitride Film $CrO_{x1}N_{y1}$ | | | | Second Chromium Oxynitride Film $CrO_{x2}N_{y2}$ | | | | Chromium Oxide Film $CrO_{x3}$ | |
|---|---|---|---|---|---|---|---|---|---|---|
| | $x_1$ | | $y_1$ | | $x_2$ | | $y_2$ | | $x_3$ | |
| | Min | Max | Min | Max | Min | Max | Min | Max | Min | Max |
| Example 1 | 0.23 | 0.27 | 0.24 | 0.26 | 0.05 | 0.10 | 0.11 | 0.16 | — | — |
| Example 2 | 0.22 | 0.27 | 0.25 | 0.27 | 0.04 | 0.08 | 0.10 | 0.16 | 0.11 | 0.20 |
| Example 3 | 0.21 | 0.27 | 0.23 | 0.25 | 0.04 | 0.07 | 0.11 | 0.13 | — | — |
| Example 4 | 0.25 | 0.30 | 0.19 | 0.21 | 0.03 | 0.05 | 0.001 | 0.01 | — | — |
| Example 5 | 0.26 | 0.30 | 0.20 | 0.22 | 0.05 | 0.07 | 0.07 | 0.09 | — | — |

TABLE 2

| | Average Breaking Strength (kgf) | Pattern Edge Profile | Optical Characteristics | | Crystallinity (XRD) θ-2θ | |
|---|---|---|---|---|---|---|
| | | | Transmittance OD Value | Reflectivity Y value (%) | $I_C$ (cps) | ($I_C/I_G$) |
| Example 1 | 9.4 | B | 4.5 | 4.9 | 736.0 | 1.29 |
| Example 2 | 9.0 | A | 4.5 | 4.9 | 775.0 | 1.35 |
| Example 3 | 8.9 | A | 4.5 | 5.1 | 758.0 | 1.33 |
| Example 4 | 5.7 | C | 4.5 | 4.9 | 994.0 | 1.74 |
| Example 5 | 6.2 | C | 4.6 | 5.0 | 918.5 | 1.61 |

While the invention has been described in detail with reference to specific embodiments thereof, it will be apparent to one skilled in the art that various changes and modifications can be made therein without departing from the spirit and scope thereof.

Incidentally, the present application is based on Japanese Patent Applications No. 2010-065964 filed on Mar. 23, 2010, and the contents are incorporated herein by reference.

Also, all the references cited herein are incorporated as a whole.

DESCRIPTION OF THE REFERENCE NUMERALS

| | |
|---|---|
| 10, 10': | Light-shielding film-attached glass substrate |
| 20: | Glass substrate |
| 30, 30': | Light-shielding film |
| 31: | First chromium oxynitride film |
| 32: | Second chromium oxynitride film |
| 33: | Chromium oxide film |
| 100: | Liquid crystal display device element |
| 200R, 200G 200B: | Color filter film |
| 300: | Protective film |
| 400: | Transparent electrically conductive film |
| 1000: | Sample |
| 2000: | Pressing jig |
| 2100: | Receiving jig |

What is claimed is:

1. A light-shielding film-attached glass substrate comprising:
a glass substrate; and
a light-shielding film having a multilayer structure and being formed on the glass substrate,
wherein said light-shielding film having a multilayer structure comprises:
a first chromium oxynitride film ($C_rO_{x1}N_{y1}$); and
a second chromium oxynitride film ($C_rO_{x2}N_{y2}$), each satisfying the following conditions and being laminated such that the first chromium oxynitride film is applied to the glass substrate and the second chromium oxynitride film is applied to the first chromium oxynitride film:

$0.15 < x_1 < 0.5$, $0.1 < y_1 < 0.35$, $0.4 < x_1 + y_1 < 0.65$, $0.03 < x_2 < 0.15$, and $0.09 < y_2 < 0.25$;

wherein a ratio $I_C/I_G$ between a maximum intensity $I_G$ of X-ray diffraction at θ-2θ=42.0° to 45.0° of the glass substrate and a maximum intensity $I_C$ of X-ray diffraction at θ-2θ=42.0° to 45.0° of the light-shielding film-attached glass substrate satisfies $I_C/I_G < 1.5$.

2. A liquid crystal display device comprising: a liquid crystal layer; and a pair of substrates for interposing the liquid crystal layer therebetween, wherein one of said pair of substrates is the light-shielding film-attached glass substrate according to claim 1.

* * * * *